US012734639B2

(12) United States Patent
Sha et al.

(10) Patent No.: US 12,734,639 B2
(45) Date of Patent: Sep. 15, 2026

(54) POWER TOOL

(71) Applicant: JIANGSU DONGCHENG M&E TOOLS CO., LTD., Nantong (CN)

(72) Inventors: Jinxing Sha, Nantong (CN); Dehan Xiao, Nantong (CN)

(73) Assignee: JIANGSU DONGCHENG M&E TOOLS CO., LTD., Nantong (CN)

( * ) Notice: Subject to any disclaimer, the term of this patent is extended or adjusted under 35 U.S.C. 154(b) by 83 days.

(21) Appl. No.: 18/870,509

(22) PCT Filed: May 24, 2024

(86) PCT No.: PCT/CN2024/095152
§ 371 (c)(1),
(2) Date: Nov. 29, 2024

(87) PCT Pub. No.: WO2025/044325
PCT Pub. Date: Mar. 6, 2025

(65) Prior Publication Data
US 2026/0183896 A1 Jul. 2, 2026

(30) Foreign Application Priority Data
Aug. 29, 2023 (CN) ........................ 202311102301.0

(51) Int. Cl.
*B24B 7/12* (2006.01)
*B24B 47/12* (2006.01)
(Continued)

(52) U.S. Cl.
CPC ............ *B24B 47/12* (2013.01); *B24B 55/102* (2013.01); *B25F 5/008* (2013.01)

(58) Field of Classification Search
CPC ........ B24B 47/12; B24B 55/102; B25F 5/008
See application file for complete search history.

(56) References Cited

U.S. PATENT DOCUMENTS 9,545,712 B2 1/2017 Kuehne et al.
2015/0151422 A1* 6/2015 Kuehne .................. B24B 55/10 451/344

(Continued)

FOREIGN PATENT DOCUMENTS

CN 1899765 1/2007
CN 109773635 5/2019

(Continued)

*Primary Examiner* — Lucas E. A. Palmer
(74) *Attorney, Agent, or Firm* — ScienBiziP, P.C.

(57) ABSTRACT

The present disclosure relates to a power tool, including a housing, a power assembly, a fan assembly, and a bottom plate assembly. The power assembly includes a motor axis, and the fan assembly includes a mounting plate and heat dissipation fan blades and dust collection fan blades integrated into the mounting plate. The fan assembly includes a first counterweight area partially thickened, which is arranged on the second surface. A ratio of a weight of the first counterweight area to a weight of the fan assembly is less than or equal to 13%. A balance block is between the fan assembly and the bottom plate assembly. The balance block includes a weight center adjustment part protruding from the periphery. The weight center adjustment part is located on a same side of the motor axis as the first weight area.

20 Claims, 9 Drawing Sheets

(51) Int. Cl.
*B24B 55/10* (2006.01)
*B25F 5/00* (2006.01)

(56) References Cited

U.S. PATENT DOCUMENTS

| | | | | |
|---|---|---|---|---|
| 2020/0254580 | A1* | 8/2020 | Valentini | B24B 41/04 |
| 2020/0361051 | A1* | 11/2020 | Finnäs | F16C 37/007 |
| 2022/0143774 | A1* | 5/2022 | Zhang | B25F 5/008 |
| 2023/0017671 | A1 | 1/2023 | Zimmerman et al. | |
| 2023/0271296 | A1 | 8/2023 | Zhang et al. | |

FOREIGN PATENT DOCUMENTS

| | | | | | |
|---|---|---|---|---|---|
| CN | 209164170 | | | 7/2019 | |
| CN | 114515987 | | | 5/2022 | |
| CN | 114515987 | A | * | 5/2022 | B24B 41/042 |
| CN | 116787283 | A | * | 9/2023 | B24B 23/04 |
| CN | 117001486 | A | * | 11/2023 | B24B 55/102 |
| JP | 2003053654 | A | * | 2/2003 | B24B 23/03 |

* cited by examiner

POWER TOOL

TECHNICAL FIELD

The present disclosure relates to a power tool, and more particularly to a power tool having a balancing weight.

BACKGROUND

As a commonly used polishing tool, a power tool is mainly used for cleaning, removing hair, and leveling and polishing large surfaces such as building decoration, furniture painting, bathroom, etc. The power tool mainly includes a housing, a power assembly, a fan assembly, an eccentric element, and a bottom plate assembly. The housing is used to accommodate the power assembly, the motor component, and the eccentric element. The bottom plate assembly is at least partially located outside the housing and is used to connect sandpaper. The eccentric element drives the bottom plate assembly to swing around a motor axis of the power assembly, thereby achieving sandpaper polishing and grinding of a workpiece.

In order to reduce vibration generated during operation of the power tool, a balance structure is often set up to balance the eccentric force of the bottom plate assembly. When setting up a balanced structure, there are mainly two forms of balanced layout for ease of installation and simplification of the structure: one type is to directly fix and connect the balanced structure with the fan element or form them as a whole; another type is an independent balance block structure.

SUMMARY

In an aspect, the present disclosure provides a power tool comprising a housing, a power assembly installed inside the housing, a fan assembly connected to the power assembly, and a bottom plate assembly driven by the power assembly. The power assembly includes a motor axis. The fan assembly includes a mounting plate connected to the power assembly, and cooling fan blades and dust collection fan blades arranged on the mounting plate. The mounting plate includes a first surface and a second surface on opposite sides. The cooling fan blades are arranged on the first surface and the dust collection fan blades are arranged on the second surface. The fan assembly includes a first counterweight area that is partially thickened, the first counterweight area is arranged on the second surface. A ratio of a weight of the first counterweight area to a weight of the fan assembly is less than or equal to 13%. A balance block is between the fan assembly and the bottom plate assembly. The balance block includes a weight center adjustment part protruding from a periphery, the weight center adjustment part and the first counterweight area are located on a same side of the motor axis.

In another aspect, the present disclosure provides a power tool comprising a housing, a power assembly installed inside the housing, a fan assembly connected to the power assembly, and a bottom plate assembly driven by the power assembly, the power assembly comprising a motor axis, the fan assembly comprising a mounting plate connected to the power assembly and heat dissipation fan blades and dust collection fan blades arranged on the mounting plate, the mounting plate comprising a first surface and a second surface on opposite sides, the heat dissipation fan blades arranged on the first surface and the dust collection fan blades arranged on the second surface; a number of the heat dissipation fan blades is greater than a number of the dust collection fan blades. The dust collection fan blades comprise at least one first counterweight fan blades that is partially thickened, the heat dissipation fan blades comprise at least one second counterweight fan blades that is partially thickened, a thickness of the first counterweight fan blades is greater than that of the second counterweight fan blades.

In a further aspect, the present disclosure provides a power tool comprising a housing, a power assembly installed inside the housing, a fan assembly connected to the power assembly, and a bottom plate assembly driven by the power assembly, the power assembly comprising a motor axis, the fan assembly comprising a mounting plate connected to the power assembly, the mounting plate comprising a first surface and a second surface on opposite sides, the first surface defining a waist shaped hole that extends through the mounting plate, and the fan assembly further comprising an eccentric element protruding from the second surface, the eccentric element comprising a first axis in a radial direction, and the mounting plate comprising a second counterweight block protruding from a periphery, an end surface of the waist shaped hole facing the second counterweight block comprising a second axis. The first axis and the second axis form a phase angle, and an angle of the phase angle approaches zero.

BRIEF DESCRIPTION OF THE DRAWINGS

The following will provide a further detailed explanation of the specific embodiments of the present disclosure in conjunction with the accompanying drawings.

DETAILED DESCRIPTION

Figure 1:
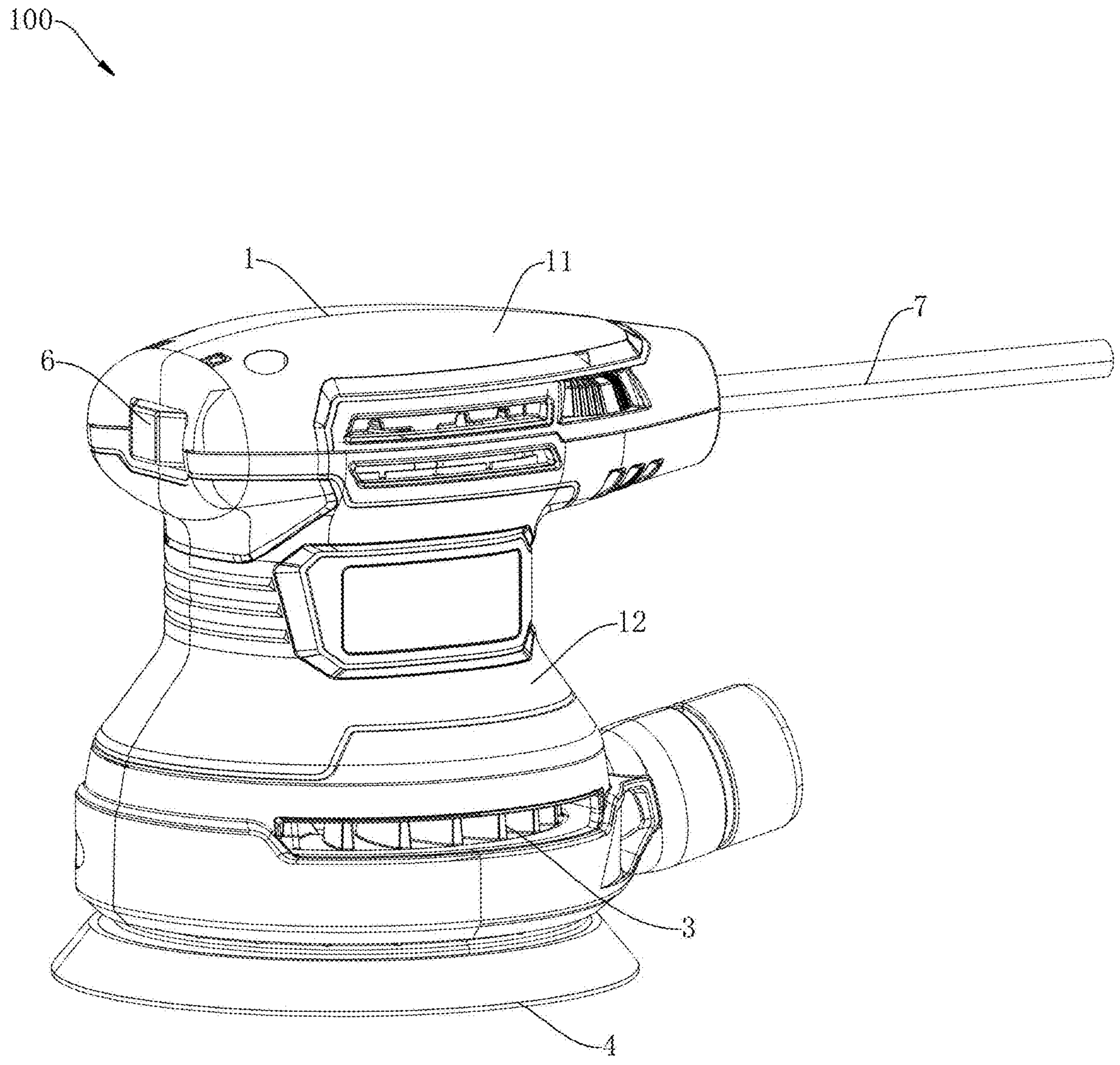
FIG. 1 is a schematic view of a power tool of the present disclosure.

Following is a further detailed explanation of the present disclosure in conjunction with the accompanying drawings and implementation methods.

The terms used in this disclosure are solely for a purpose of describing specific embodiments and are not intended to limit the present disclosure. For example, the following words such as “up”, “down”, “front”, “back”, “left”, “right” indicating orientation or positional relationships are only based on orientation or positional relationships shown in the drawings, and are only for the convenience of describing the present disclosure and simplifying the description, rather than indicating or implying that the device/component referred to must have a specific orientation or be constructed and operated in a specific orientation. Therefore, it cannot be understood as a limitation of the present disclosure.

Figure 2:
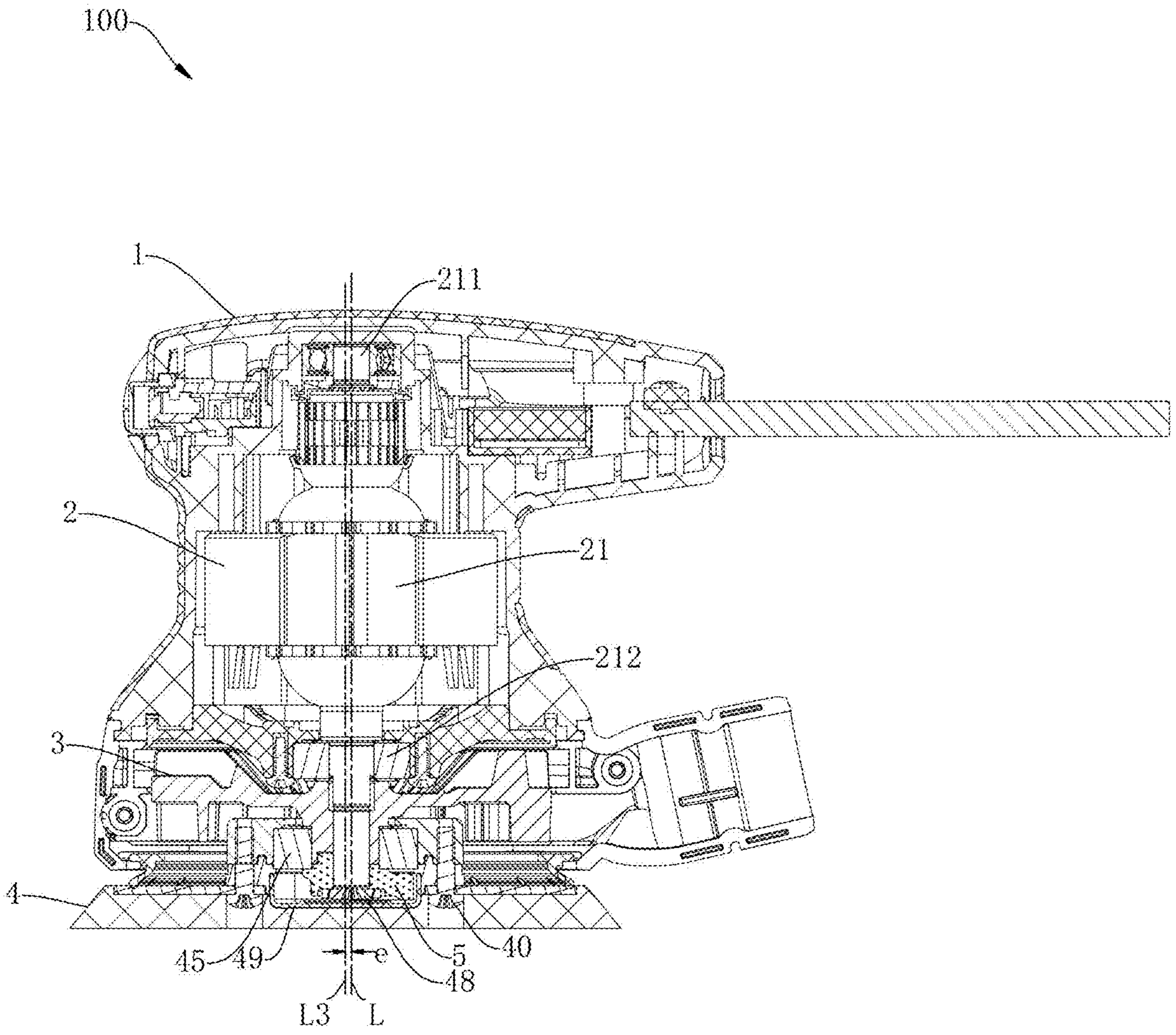
FIG. 2 is a cross-sectional view of the power tool shown in FIG. 1.
Figure 3:
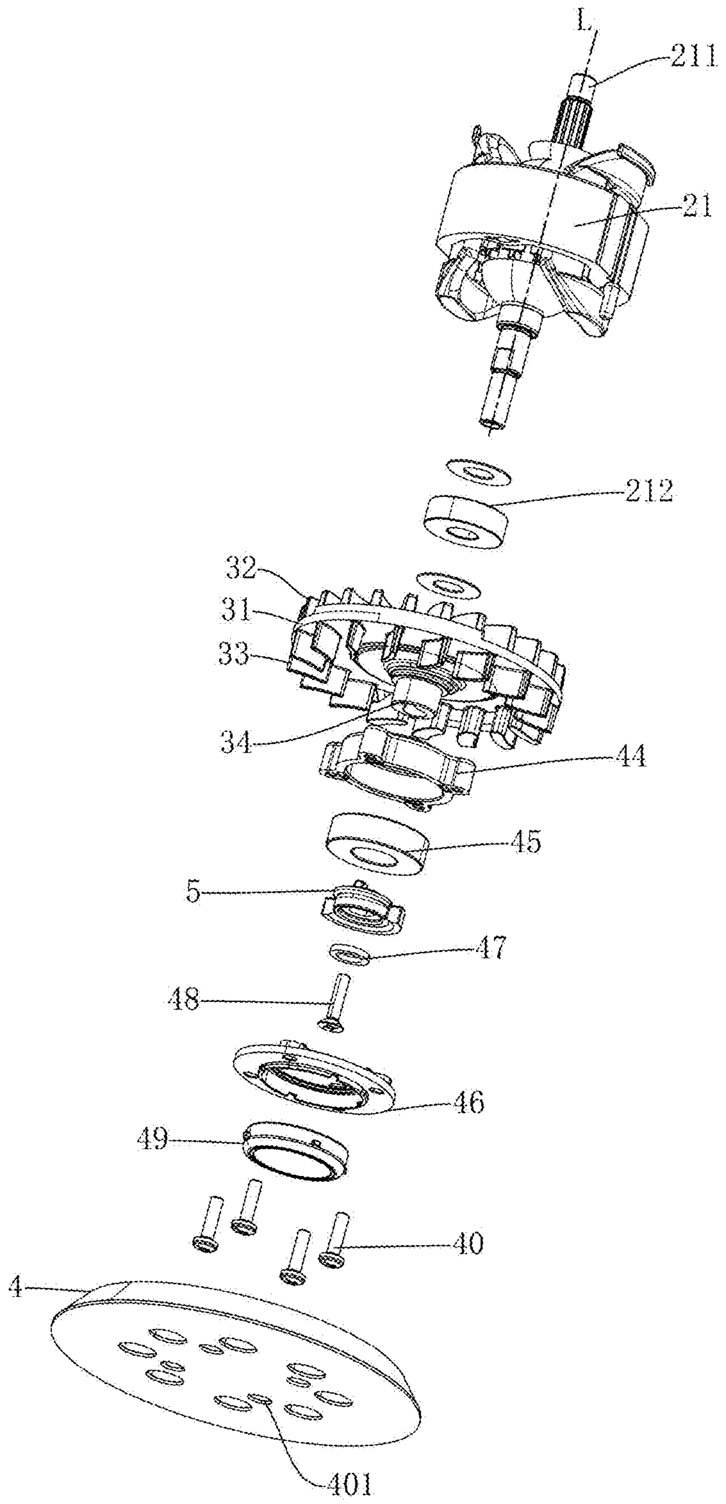
FIG. 3 is an exploded view of a partial structure of the power tool shown in FIG. 2.

Referring to FIG. 1 to FIG. 3, an embodiment of the present disclosure relates to a power tool 100, including a housing 1, a power assembly 2 installed inside the housing 1, a fan assembly 3 connected to the power assembly 2, a bottom plate assembly 4 driven by the power assembly 2, and a switch 6 for controlling the operation of the power tool 100. The housing 1 has a grip part 11 for users to hold and a housing 12 for accommodating the power assembly 2 and the fan assembly 3. One end of the grip part 11 is connected to the housing 12, and the other end is used to connect a power cord 7 of the power tool 100 or form a connection base to install a portable DC power source such as a battery pack. In this embodiment, the power tool 100 uses AC power provided by the power cord 7.

The switch 6 is installed on the housing 1, specifically, the switch 6 is installed on the grip part 11. When the user's palm is wrapped around the grip part 11, fingers can easily toggle switch 6 to control start and stop of the power tool 100.

The power assembly 2 includes a motor axis L and a motor 21 rotates along the motor axis L. The motor 21 serves as a prime mover of the power tool 100 and is installed inside the housing 12. The motor 21 includes a motor shaft 211 for transmitting power to the fan assembly 3. The motor shaft 211 rotates along the motor axis L, which extends in a vertical direction.

The housing 1 is formed with an air inlet, an air outlet, and a dust outlet. The fan assembly 3 is fixedly connected to the motor shaft 211, meaning that when the motor 21 rotates, the fan assembly 3 runs accordingly. When the fan assembly 3 rotates, airflow enters through the air inlet, flows through motor 21 and other components, and finally exits through the air outlet, thereby achieving an effect of dissipating heat from the motor 21 and other components inside the housing 1. On the other hand, the airflow can effectively blow the dust processed on the bottom plate assembly 4 to the dust outlet, and finally enter the dust collection box (not shown), thereby achieving the dust collection effect.

The fan assembly 3 includes a mounting plate 31 connected to the drive component 2, and cooling fan blades 32 and dust collection fan blades 33 arranged on the mounting plate 31. The mounting plate 31 is fitted around an outer circumference of the motor shaft 211. When the motor 21 rotates by the energy source provided by the power cord 7, the fan assembly 3 is driven to rotate around the motor axis L, generating dust collection airflow and/or heat dissipation airflow.

The cooling fan blades 32 and the dust collection fan blades 33 are integrated together to form a double-sided fan form, which is conducive to shortening a height of the power tool 100 in the vertical direction, making a overall structure more compact, and reducing a weight of the power tool 100.

Figure 5:
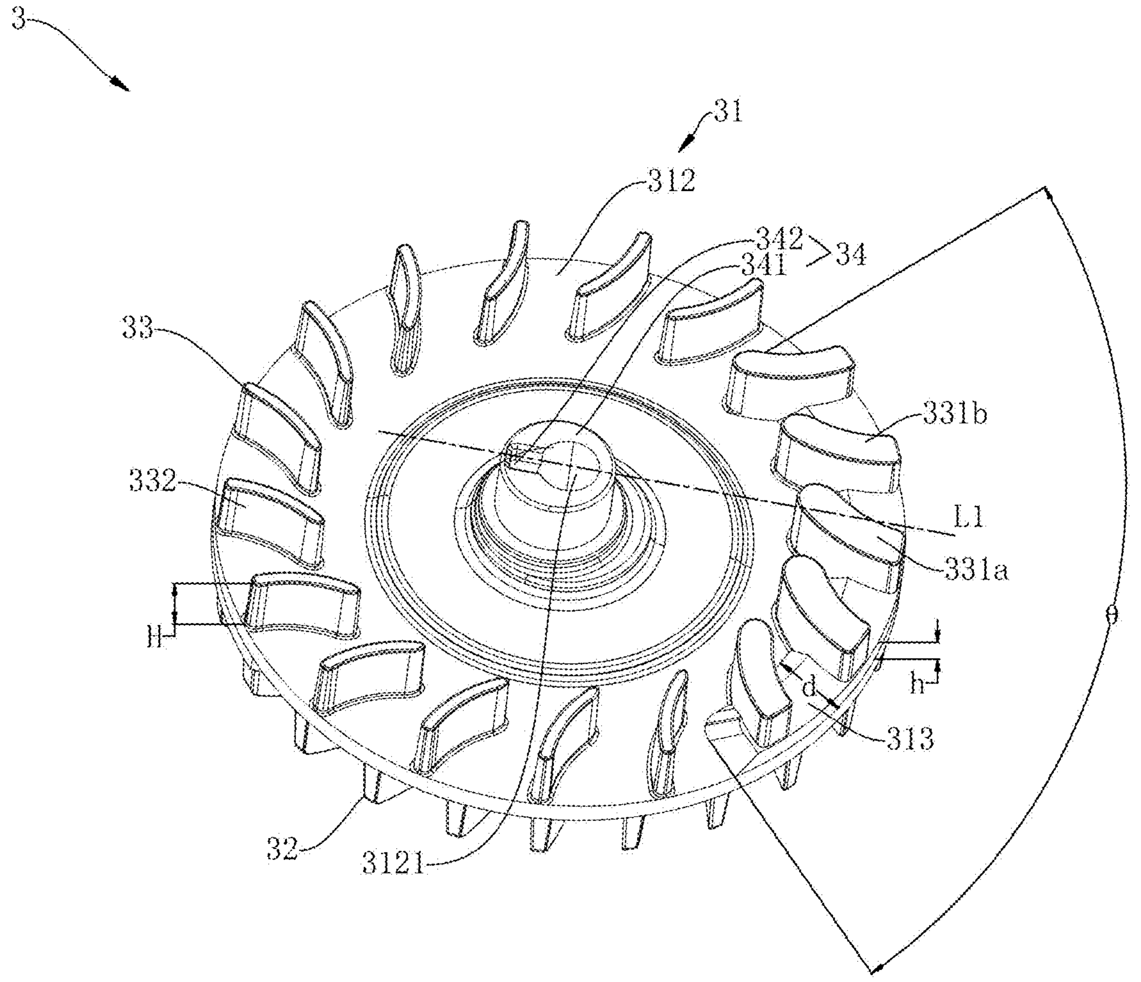
FIG. 5 is a schematic view of a structure of the fan assembly of the power tool shown in FIG. 4.
Figure 6:
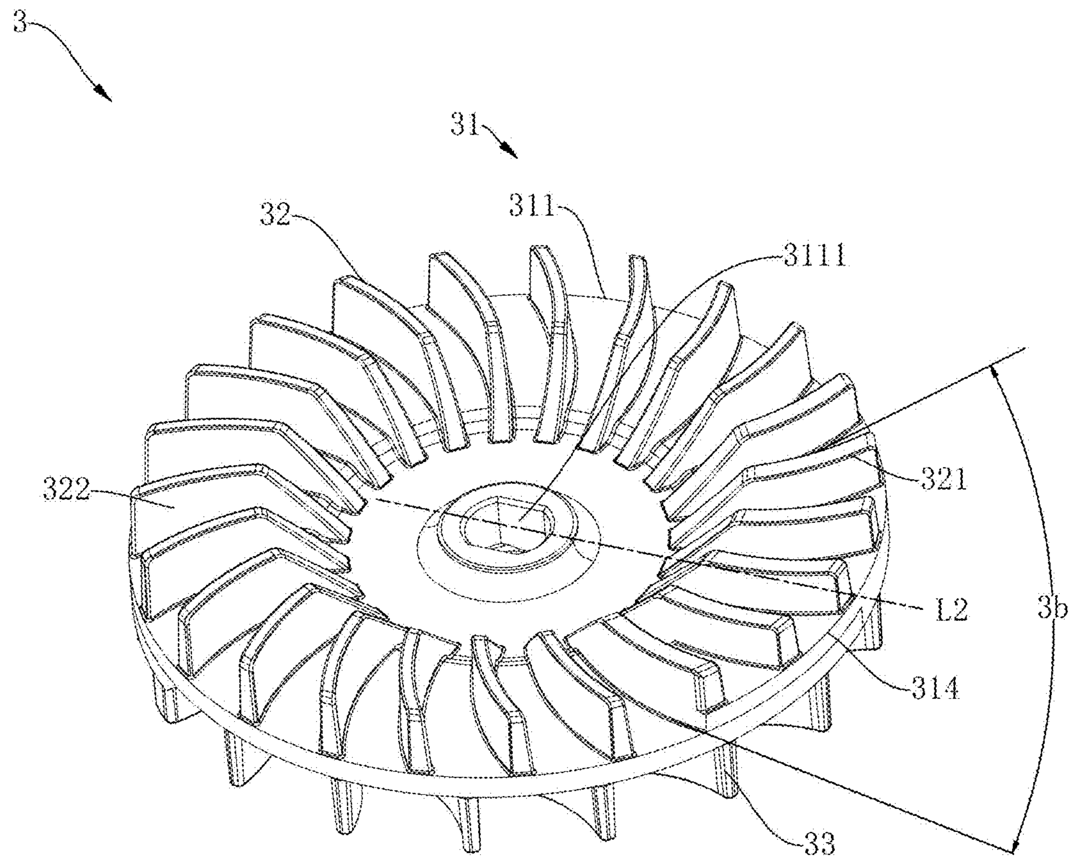
FIG. 6 is a schematic view of the fan assembly of the power tool shown in FIG. 5 from another perspective.

As shown in FIG. 5 and FIG. 6, the mounting plate 31 has a first surface 311 and a second surface 312 arranged on opposite sides. The cooling fan blades 32 are arranged on the first surface 311, and the dust collection fan blades 33 are arranged on the second surface 312. The cooling fan blades 32 and the dust collection fan blades 33 are both curved in an arc shape. When viewed from the bottom plate assembly 4, arc shape of the dust collection fan blades 33 is distributed counterclockwise with the motor axis L as the center line, which facilitates collection of dust and debris. The cooling fan blades 32 are distributed in a clockwise direction with the motor axis L as the center line, sucking in air to cool the motor 21 and other components in the housing 1, achieving an effect of heat dissipation.

As shown in FIG. 2 and FIG. 5, the fan assembly 3 also has an eccentric element 34 protruding from the second surface 312. The eccentric element 34 is mounted on the motor shaft 211 and is eccentrically arranged relative to the motor shaft 211. The eccentric element 34 is fixedly connected to the mounting plate 31. It should be noted that eccentrically arranging relative to the motor shaft 211 refers to the eccentric element 34 has an eccentric axis L3, the eccentric axis L3 is parallel to the motor axis L and has an eccentric distance e between the eccentric axis L3 and the motor axis L. The existence of the eccentric distance e enables the eccentric element 34 to transmit rotation of the motor shaft 211 to the rotation and revolution of other components connected to the eccentric element 34 when the motor shaft 211 rotates.

Figure 8:
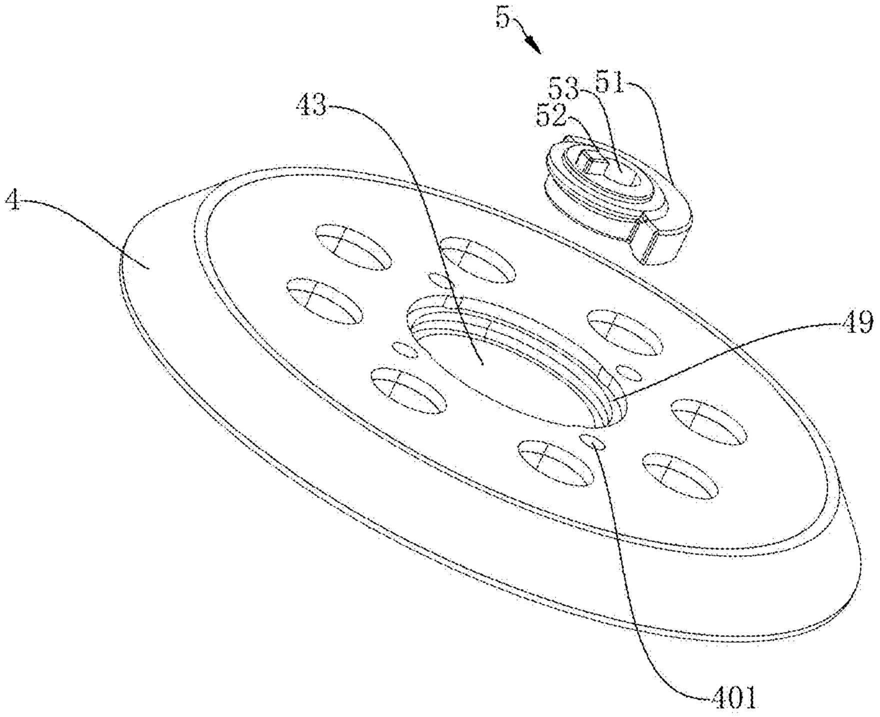
FIG. 8 is a schematic view of the structure of the bottom plate assembly and the balance block of the power tool shown in FIG. 1.
Figure 9:
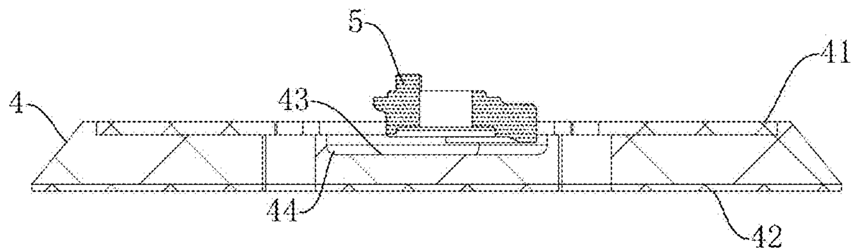
FIG. 9 is a schematic sectional view of the bottom plate assembly and the balance block of the power tool shown in FIG. 8.

As shown in FIG. 2, FIG. 8, and FIG. 9, the bottom plate assembly 4 at least partially covers the housing 12, and the motor shaft 211 can drive the bottom plate assembly 4 to move, thereby enabling the bottom plate assembly 4 to perform eccentric grinding work relative to the housing 1.

Specifically, the eccentric element 34 is connected to the bottom plate assembly 4, and the motor shaft 211 transmits power to the bottom plate assembly 4 by the eccentric element 34. The bottom plate assembly 4 includes an upper surface 41 and a lower surface 42 arranged on opposite sides. The upper surface 41 is arranged on a side close to the fan assembly 3 relative to the lower surface 42. The lower surface 42 is used to install sandpaper and other polishing elements. The upper surface 41 has a circular groove 43 recessed from the center, and the balance block 5 is installed in the circular groove 43. Driven by the motor shaft 211 and the eccentric element 34, the balance block 5 drives the bottom plate assembly 4 to perform eccentric motion, which in turn drives the sandpaper to continuously rub against a surface of the workpiece being processed, achieving functions such as grinding and polishing.

In this embodiment, the bottom plate assembly 4 also includes a supporting ring 49 installed in the circular groove 43. The supporting ring 49 is used to install the balance block 5, thereby reducing an impact force generated by eccentric movement of the balance block 5 and playing a certain buffering role, thereby reducing vibration of the whole machine. If the supporting ring 49 is not set, an overall height of the machine will increase, especially for the power tool 100 in this embodiment. As the height increases, a gravity center will also shift upwards, affecting the vibration effect.

As shown in FIG. 2, the bottom plate assembly 4 also includes a bearing seat 44 installed on the fan assembly 3, a first bearing 45 installed in the bearing seat 44, and a bearing pressure plate 46 connected to the bearing seat 44. The bearing seat 44 is used to reduce the friction coefficient between the motor shaft 211 and the eccentric element 34 installed on the motor shaft 211 during rotation, ensuring the rotational accuracy and parallelism of the motor shaft 211.

Furthermore, the bearing seat 44 and the bearing pressure plate 46 form a receiving space, the first bearing 45 locates within the receiving space. The motor shaft 211 is fitted onto an inner ring of the first bearing 45, and an outer ring of the first bearing 45 is connected to an inner wall of the bearing seat 44. Balls in the first bearing 45 allow the outer ring of the first bearing 45 to move relative to the inner ring of the first bearing 45.

In this embodiment, the bearing seat 44 is fixedly connected to the outer ring of the first bearing 45. That is, they form a synchronous connection. The bearing seat 44 is fixedly connected to the bottom plate assembly 4, which means that the bottom plate assembly 4 can move synchronously with the bearing seat 44 and the outer ring of the first bearing 45. It should be noted that fixed connection between the bearing seat 44 and the bottom plate assembly 4 refers to that the bottom plate assembly 4 includes at least one fastening screw 40, which passes through an installation hole 401 of the bottom plate assembly 4, penetrates the bearing pressure plate 46, and is fixed to the bearing seat 44.

Furthermore, the bearing seat 44, the bearing pressure plate 46, the first bearing 45, and a gasket 47 attached to a surface of the first bearing 45 are axially locked by locking screws 48, so that the balance block 5 is fixedly connected to the motor shaft 211. That is, the balance block 5 can move synchronously with the motor shaft 211. By the above settings, when the motor shaft 211 rotates, it drives the fan assembly 3 to rotate, thereby driving eccentric motion of the balance block 5. As the balance block 5 is installed in the bearing seat 44, which is fixedly connected to the bottom plate assembly 4, efficient grinding of the bottom plate assembly 4 can be achieved.

Figure 4:
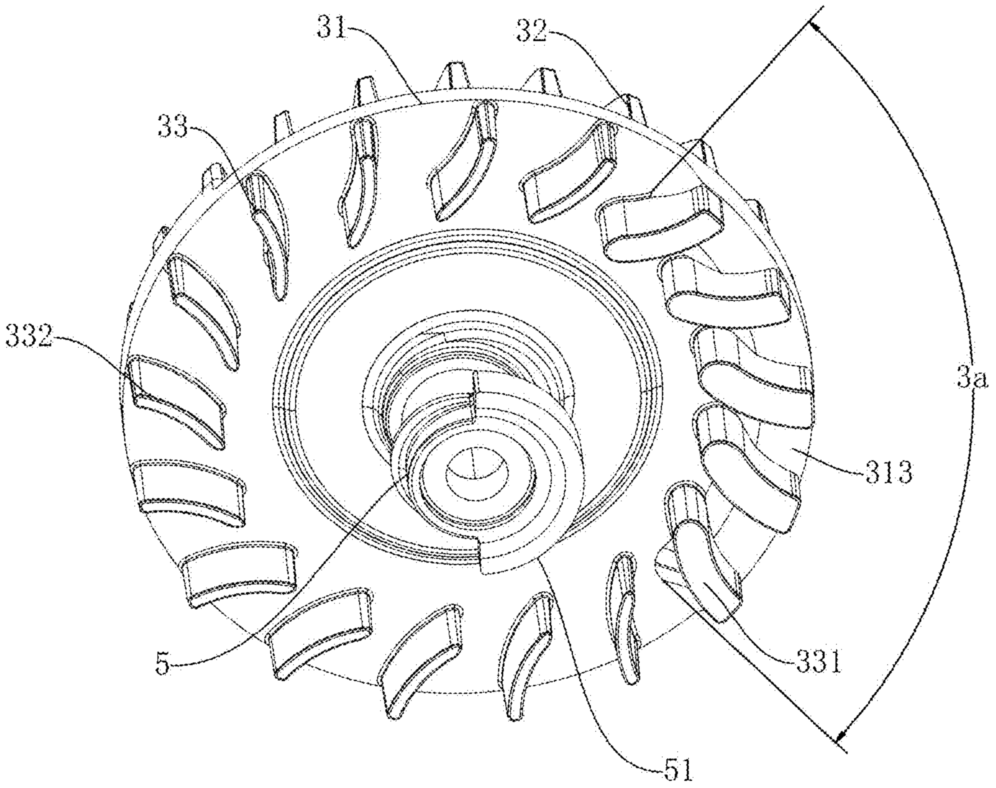
FIG. 4 is a schematic view of a fan assembly and a balance block structure of the power tool shown in FIG. 3.

As shown in FIG. 3 and FIG. 4, the balance block 5 is used to balance the bottom plate assembly 4. In a direction along the motor axis L, the balance block 5 is set between the fan assembly 3 and the bottom plate assembly 4. The balance block 5 is detachably connected to the eccentric element 34. That is, the eccentric element 34 and the balance block 5 move synchronously, and the balance block 5 can rotate around the motor axis L with the eccentric element 34.

Figure 7:
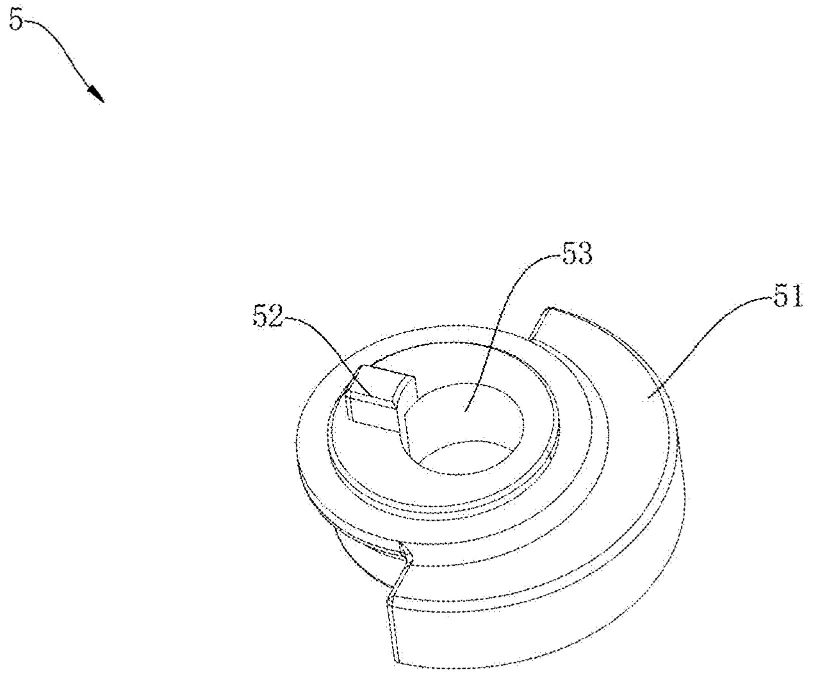
FIG. 7 is a schematic view of the balance block structure of the power tool shown in FIG. 3.

As shown in FIG. 7 to FIG. 9, the balance block 5 includes a weight center adjustment part 51 protruding from a periphery. In this embodiment, the weight center adjustment part 51 is integrally formed with the balance block 5, but it should be noted that the weight center adjustment part 51 can also be fixedly connected to the balance block 5. A size of the weight center adjustment part 51 is adjusted according to a difference between a weight of the dust collection fan blades 33 and a total balance weight, in order to adjust a position of the weight center and achieve balance between a weight and a torque of the bottom plate assembly 4.

In this embodiment, the balance block 5 is at least partially disposed in the bottom plate assembly 4, and a circular groove 43 that is recessed downward from the upper surface 41 can be used for the balance block 5 to move. The circular groove 43 is coaxial with the motor axis L. The balance block 5 partially overlaps with the bottom plate assembly 4 in its axial direction, which significantly lowers the weight center position of the fan assembly 3 and reduces an overall vibration of the machine.

Specifically, a ratio of the area of circular groove 43 to the area of the bottom plate assembly 4 is less than or equal to 7.5%. On the one hand, by setting a reasonable range for a thinning area on the bottom plate assembly 4, it ensures that the balance block 5 has sufficient space for movement, while avoiding situation where the thinning area of the circular groove 43 is too large, increasing size of the transmission component in a radial direction, and increasing strength of the bottom plate assembly 4, improving its buffering capacity and enhancing the user experience of the power tool 100 during operation. On the other hand, placing the balance block 5 as close as possible to the bottom plate assembly 4 can lower the weight center of the balance block 5, which not only shortens the torque but also reduces the size of the entire machine in the vertical direction, making the overall structure more compact.

As shown in FIG. 2 to FIG. 5, the eccentric element 34 is integrally formed with the mounting plate 31 of the fan assembly 3. That is, the eccentric element 34 is formed on the mounting plate 31. The fan assembly 3 is mounted on the motor shaft 211 and can be driven to rotate by the motor shaft 211.

In this embodiment, the mounting plate 31 has a first counterweight block 313 protruding from a periphery. The first counterweight block 313 is arranged on the second surface 312. A plurality of first counterweight fan blades 331 is set on the first counterweight block 313. A ratio of a sum of weight of the first counterweight fan blades 331 and the first counterweight block 313 to a weight of the fan assembly 3 is less than or equal to 13%. That is to say, a counterweight on the dust collection fan blades 33 is relatively light, resulting in a less weight of the fan assembly 3. That is, a rotational inertia generated by the fan assembly 3 during rotation is little, the balance force is little, and the whole machine runs smoothly, greatly improving the user's operating comfort.

Specifically, when the motor 21 drives the fan assembly 3 to rotate, the fan assembly 3 generates a moment of inertia, which forms a restraining force that keeps the fan assembly 3 rotating around the motor axis L. This restraining force causes the power tool 100 to move in an opposite direction of its motion, requiring the user to apply more force to overcome the restraining force and increase the user's operational fatigue. If the power tool 100 is used for a long time, the numbness caused by vibration will greatly affect work efficiency.

Furthermore, in an internal structure of power tool 100, the weight of motor 21 and the fan assembly 3 is relatively heavy compared to the weight of other components. That is, the weight of the power tool 100 is mainly concentrated in the motor 21 and the fan assembly 3. By designing a structure of the fan assembly 3, the weight of the fan assembly 3 is greatly reduced, resulting in a smaller rotational inertia and lighter weight of the power tool 100, improving user comfort and increasing work efficiency.

As shown in FIG. 3 to FIG. 6, the mounting plate 31 is fixedly connected to the motor shaft 211. That is, the motor shaft 211 is sleeved on an outer ring of the motor shaft 211 to achieve synchronous rotation. The first surface 311 has a waist hole 3111 that extends through the mounting plate 31, and the second surface 312 has a circular hole 3121 that extends through the mounting plate 31. The waist hole 3111 is connected to the circular hole 3121. Furthermore, the motor shaft 211 penetrates through the waist hole 3111 on the first surface 311 and exits through the circular hole 3121 on the second surface 312. The motor shaft 211 can drive the fan assembly 3 to rotate synchronously.

The mounting plate 31 is symmetrically arranged relative to the motor axis L. The cooling fan blades 32 and the dust collection fan blades 33 are evenly distributed along the circumferential direction of the motor axis L on the first surface 311 and the second surface 312 of the mounting plate 31, respectively. When the motor shaft 211 drives the mounting plate 31 to rotate, the dust collection and heat dissipation of the power tool are carried out simultaneously. Specifically, the airflow generated by the rotation of the cooling fan blades 32 dissipates heat to the entire machine, while the airflow generated by the rotation of the dust collection fan blades 33 throws the dust generated during processing towards the dust outlet, achieving a dust collection effect.

As shown in FIG. 5 and FIG. 6, the dust collection fan blades 33 have first counterweight fan blades 331 that are partially thickened and multiple first ordinary fan blades 332. The thickness of the first counterweight fan blades 331 is greater than that of the first ordinary fan blades 332, and the thickness of each first ordinary fan blades 332 is equal to each other. There is at least one first counterweight fan blades 331, and the thickness can be designed as equal or unequal blades according to actual needs. In this embodiment, the thickness of the first counterweight fan blades 331 is designed as unequal blades, and there is a blade with a thickest thickness.

Specifically, there is at least one first counterweight fan blades 331, and a number of the first counterweight fan blades 331 is odd, such as 1, 3, or 5. It should be noted that in this embodiment, the number of the first counterweight blades 331 is 5. In this way, after reaching the balance of weight, on the one hand, an impact on the dust collection effect of the dust collection fan blades 33 is smaller. On the other hand, it can also adjust smoothness of the fan assembly 3 during operation, improving the efficiency of the power tool 100.

As shown in FIG. 5 and FIG. 6 again, the first counterweight fan blades 331 and the first counterweight block 313 form a first counterweight area 3*a*, which is arranged on the second surface 311 to achieve torque balance and weight center overlap on the dust collection fan blades 33.

In this embodiment, the first counterweight block 313 is an arc-shaped counterweight block, and a ratio of a radial width d of the arc-shaped counterweight block 313 to a diameter D of the mounting plate 31 is less than or equal to 11%. A ratio of a height h of the arc-shaped weight block 313 to a height H of the dust collection fan blades 33 is less than or equal to 30%. By the above settings, the weight of the arc-shaped counterweight block 313 is greatly reduced, resulting in a decrease in the weight of the first counterweight area 3*a*, a reduction in the moment of inertia, and an improvement in operational comfort. In addition, the first counterweight block 313 at the dust collection end of the dust collection fan blades 33 is designed as a circular structure, which has a relatively small impact on dust collection of the fan assembly 3.

As shown in FIG. 5, the eccentric element 34 includes an eccentric shaft 341 connected to the power assembly and a concave part 342 recessed from a shaft end of the eccentric shaft 341. Among them, the eccentric shaft 341 is fixedly connected or integrally formed with the mounting plate 31. In this embodiment, the eccentric shaft 341 is integrally formed with the mounting plate 31. The circular hole 3121 extends through all the way to the eccentric shaft 341, and the motor shaft 211 is installed on the eccentric shaft 341 to achieve synchronous rotation. As shown in FIG. 5, the balance block 5 also has an engagement part 52 protruding from its end surface, the engagement part 52 and the weight center adjustment part 51 are arranged on both sides of the motor axis L. The engagement part 52 is combined with the concave part 342, which can form a synchronous rotation between the motor shaft 211 and the eccentric element 34, thereby driving the bottom plate assembly 4 to swing around the motor axis L as the rotation center, thus achieving sandpaper polishing and grinding of the workpiece during machining. It should be noted that in this embodiment, the engagement part 52 is located on a left side of the balance block 5 along the motor axis L, and the weight center adjustment part 51 is located on a right side of the balance block 5 along the motor axis L.

In this embodiment, the first counterweight area 3*a* and the second surface 311 form an angle θ, the angle θ is less than or equal to 120°. It should be noted that when the angle θ is less than or equal to 120°, it means that the first counterweight area 3*a* is not evenly divided by the plane composed of the motor axis L and the eccentric axis L3, and the angle θ is within this range, achieving weight center overlap and not easily accumulating dust in the dust collection fan blades 33, thereby not affecting the dust collection effect of the dust collection end of the dust collection fan blades 33.

The cooling fan blades 32 have a second counterweight fan blades 321 that is partially thickened and multiple second ordinary fan blades 322. A thickness of the second counterweight fan blades 332 is greater than that of the second ordinary fan blades 322, and the thickness of the multiple of the second ordinary fan blades 322 is equal. There is at least one second counterweight fan blades 321, and thickness can be designed as equal or unequal fan blades according to actual needs. In this embodiment, the thickness of the second counterweight fan blades 321 is unequal, and there is a blade with the thickest thickness.

A number of blades of the cooling fan blades 32 is greater than that in the dust collection fan blades 33. Within a reasonable range, the more blades in the cooling fan blades 32, the more dispersed the airflow into multiple parts, resulting in a corresponding reduction in friction between the airflow and the blades, more air output, and better heat dissipation effect. A distribution spacing of the dust collection fan blades 33 is large to avoid dust accumulation during dust removal, which may affect the service life of the power tool 100.

Furthermore, the thickness of the first counterweight fan blades 331 is greater than that of the second counterweight fan blades 321. It should be noted that since the first counterweight fan blades 331 is set in an opposite direction of the eccentric element 34, in order to reduce the eccentric force generated by the eccentric element 34 and counteract this eccentric force, a balance needs to be installed on the dust collection fan blades 33. The second counterweight fan blades 321 on the cooling fan blades 32 is used to match the weight center and maintain the weight center of the fan assembly 3 in an overlapping state.

There is a second counterweight block 314 protruding from the periphery of the mounting plate 31. The second counterweight block 314 and the first counterweight block 313 are on opposite sides of the mounting plate 31. The second counterweight block 314 is set on the first surface 311 and partially covers the first surface 311. The second weight fan blades 321 are set on the second counterweight block 314. A height of the second counterweight block 314 is less than that of the second counterweight fan blades 321, which achieves the heat dissipation effect of the power tool 100 without affecting the heat dissipation effect when the weight center of the cooling fan blades 32 overlaps.

The second counterweight fan blades 321 and the second counterweight block 314 form a second counterweight area 3*b*, which is arranged on the first surface 311. Furthermore, the first counterweight area 3*a* and the second counterweight area 3*b* are arranged on both sides of the motor axis L, and are positioned away from each other, achieving the dual effect of balancing the counterweight and overlapping the weight center of the fan assembly 3.

As shown in FIG. 3 and FIG. 4 again, the power tool 100 also includes a second bearing 212 installed above the fan assembly 3. The second bearing 212 is mounted on the motor shaft 211, supporting the motor shaft 211 to drive the fan assembly 3 to perform a tilting motion. It should be noted that the eccentric motion of the relevant parts connected to the second bearing 212 has caused a significant eccentric force, resulting in numbness in the hands of the power tool 100 during grinding, which in turn affects comfort of the operator.

In this embodiment, the weight center adjustment part 51, the first counterweight fan blades 331, and the first counterweight block 313 are arranged on a same side of the motor axis L and in the opposite direction of the eccentric axis L3 of the eccentric element 34, in order to reduce impact of centrifugal force on the overall operation of the machine.

Please refer to FIG. 5, FIG. 7 to FIG. 9, the balance block 5 includes a through hole 53 for installing the motor shaft 211. The circular hole 3121 is coaxial with the through hole 53 to ensure synchronous movement of the motor shaft 211 and the balance block 5. Among them, the balance block 5 performs eccentric motion with the motor axis L as the rotation center, driving the bottom plate assembly 4 to perform eccentric motion and grinding processing.

In this embodiment, the balance block 5 is used to achieve a dual balance of mass balance and torque balance for the bottom plate assembly 4. Specifically, a torque of the balance block 5 from the center of the through hole 53 accounts for 40% to 50% of a torque of the first counterweight area 3*a* from the center of the circular hole 3121. It should be noted that the torque is equal to a product of an applied force and a force arm. In this embodiment, a length of the force arm of the balance block 5 is a length from the center of the through hole 53 to the outer edge of the balance block 5, while a length of the force arm of the first counterweight area 3*a* is a length from the center of the circular hole 3121 to the outer edge of the fan assembly 3. By setting up the above structure, an overall size of the balance block 5 can be significantly reduced, avoiding the thinning area of the circular groove 43 being too large, which may cause a decrease in the stiffness of the bottom plate assembly 4 and its buffering capacity during the polishing and polishing work of the power tool 100, an overall vibration of the machine is large, affecting the user's hand experience and leading to fatigue.

As shown in FIG. 5 and FIG. 6 again, the eccentric element 34 has a first axis L1 in the radial direction, which coincides with a center point of the concave part 342. The weight of the first counterweight fan blades 331*a* intersecting with the first axis L1 is greater than that of the other first counterweight fan blades 331*b*. It should be noted that the position of the first counterweight fan blades 331*a* is the highest point of the weight center. Without affecting the dust collection effect, the thickness of the first counterweight fan blades 331*a* is designed to be greater than that of the other first counterweight fan blades 331*b* as needed, thereby achieving the dual effect of weight center balance and weight center overlap.

An end face of the waist hole 3111 faces the second counterweight block 314 and has a second axis L2. The first axis L1 forms a phase angle with the second axis L2, and the phase angle is as close to 0 as possible. It should be noted that presence of the phase angle affects the eccentric balancing problem caused by the eccentric element 34 in the actual machining process. The closer the phase angle approaches 0, the higher the balance of the balancing, and the more effective the elimination of force. Furthermore, the best effect is achieved when the first axis L1 is parallel or collinear with the second axis L2.

The fan assembly 3 is made of metal material. In this embodiment, the fan assembly 3 is made of aluminum alloy material. Firstly, it can reduce a large weight volume caused by the pure aluminum alloy fan weight, which affects the cooling and dust collection effect of the fan assembly 3. Secondly, if a denser zinc alloy fan is used, although the weight volume is reduced, a high cost of zinc alloy leads to a higher overall cost, which affects the cost-effectiveness of the entire machine. Then, if a plastic embedded metal block fan is used, although both volume and cost can be balanced, its fan rigidity is poor, which can cause resonance and numbness. Finally, if an independent balance block structure is used, a large unbalanced force will result in a larger volume of the balance block, which in turn will cause the diameter of the supporting ring 49 of the sealing balance block 5 to be larger, which will cause the thickness of the circular groove 43 to increase in the axial direction at the location where the bottom plate assembly 4 avoids, affecting a buffering capacity of the bottom plate assembly 4 and ultimately affecting the vibration effect.

In this embodiment, the balancing method combining the fan assembly 3 and the independent balancing block 5 is used to disperse the balancing weights into the first counterweight area 3*a* and the balancing block 5, thereby achieving the function of balancing the entire machine. It also avoids the excessive volume of the fan assembly 3 and/or the balance block 5, which may affect the dust collection efficiency of the entire machine. By the above settings, the power tool 100 achieves a good balance between functionality (heat dissipation, dust collection, and balance), economy, and processability.

The present disclosure is not limited to the specific embodiments described above. Ordinary technicians in this field can easily understand that there are many alternative solutions for the power tool of the present disclosure without departing from the principles and scope of the present disclosure. The scope of protection of the present disclosure shall be subject to the contents of the claims.

The invention claimed is:

1. A power tool comprising:

a housing, a power assembly installed inside the housing, a fan assembly connected to the power assembly, and a bottom plate assembly driven by the power assembly, the power assembly comprising a motor axis, the fan assembly comprising a mounting plate connected to the power assembly, and cooling fan blades and dust collection fan blades arranged on the mounting plate, the mounting plate comprising a first surface and a second surface on opposite sides, the cooling fan blades arranged on the first surface and the dust collection fan blades arranged on the second surface;

wherein the fan assembly comprises a first counterweight area that is partially thickened, the first counterweight area is arranged on the second surface; a ratio of a weight of the first counterweight area to a weight of the fan assembly is less than or equal to 13%;

a balance block is between the fan assembly and the bottom plate assembly, the balance block comprises a weight center adjustment part protruding from a periphery, the weight center adjustment part and the first counterweight area are located on a same side of the motor axis.

2. The power tool of claim 1, wherein the dust collection fan blades comprise at least one first counterweight fan blades that is partially thickened and a plurality of first ordinary fan blades, a thickness of the first counterweight fan blades is greater than that of the first ordinary fan blades, the first counterweight area comprises a first counterweight block protruding from a periphery of the mounting plate and the first counterweight fan blades on the first counterweight block; a number of the first counterweight fan blades is at least one, and the first counterweight fan blades and the first counterweight block are located on a same side of the motor axis.

3. The power tool of claim 2, wherein the first counterweight block is an arc-shaped weight block, and a ratio of a radial width of the first counterweight block to a diameter of the mounting plate is less than or equal to 11%, a ratio of a height of the first counterweight block to a height of the dust collection fan blades is less than or equal to 30%.

4. The power tool of claim 2, wherein the first surface comprises a waist hole that extends through the mounting plate, and the second surface comprises a circular hole that extends through the mounting plate, the waist hole is connected to the circular hole.

5. The power tool of claim 4, wherein the balance block comprises a through hole for installing the power assembly, and the circular hole is coaxial with the through hole, a torque of the balance block from a center of the through hole accounts for 40% to 50% of a torque of the first counterweight area from a center of the circular hole.

6. The power tool of claim 5, wherein the fan assembly further comprises an eccentric element protruding from the second surface, the eccentric element comprises an eccentric shaft connected to the power assembly and a concave part recessed from a shaft end of the eccentric shaft; the balance block further comprises a engagement part protruding from an end surface, the engagement part and the weight center adjustment part are arranged on opposite sides of the motor axis, and the engagement part is combined with the concave part.

7. The power tool of claim 6, wherein the eccentric element comprises a first axis in a radial direction, the first axis coincides with a center point of the concave part, a weight of the first counterweight fan blades intersecting with the first axis is greater than that of the other first counterweight fan blades.

8. The power tool of claim 7, wherein the cooling fan blades comprise second counterweight fan blades that are partially thickened and a plurality of second ordinary fan blades, a thickness of the second counterweight fan blades is greater than that of the second ordinary fan blades, and a second counterweight block protrudes from a periphery of the mounting plate, the second counterweight block is opposite to the first counterweight block on the mounting plate; the plurality of second counterweight fan blades is arranged on the second counterweight block, the second counterweight fan blades and the second counterweight block form a second counterweight area, the second counterweight area is arranged on the first surface.

9. The power tool of claim 2, wherein a number of the first counterweight fan blades is 5.

10. The power tool of claim 1, wherein the first counterweight area forms an angle on the second surface, the angle is less than or equal to 120 degrees.

11. The power tool of claim 1, wherein the bottom plate assembly comprises a circular groove that is concave in a center of the bottom plate assembly, and the balance block is installed in the circular groove, a ratio of an area of the circular groove to an area of the bottom plate assembly is less than or equal to 7.5%.

12. The power tool of claim 11, wherein the bottom plate assembly further comprises a supporting ring installed in the circular groove, and the supporting ring is combined with the balance block.

13. The power tool of claim 1, wherein an end face of the waist hole facing the second counterweight block has a second axis, and the first axis is parallel or collinear with the second axis.

14. The power tool of claim 13, wherein the first counterweight area and the second counterweight area are arranged on both sides along the motor axis.

15. The power tool of claim 13, wherein a height of the second counterweight block is less than a height of the second counterweight fan blades.

16. The power tool of claim 1, wherein both the cooling fan blades and the dust collection fan blades are in a curved arc shape, in an upward direction of the bottom plate assembly, arc shape of the cooling fan blades is distributed clockwise around the motor axis, and arc shape of the dust collection fan blades is distributed counterclockwise around the motor axis.

17. A power tool comprising:

a housing, a power assembly installed inside the housing, a fan assembly connected to the power assembly, and a bottom plate assembly driven by the power assembly, the power assembly comprising a motor axis, the fan assembly comprising a mounting plate connected to the power assembly, and cooling fan blades and dust collection fan blades arranged on the mounting plate, the mounting plate comprising a first surface and a second surface on opposite sides, the cooling fan blades arranged on the first surface and the dust collection fan blades arranged on the second surface; a number of the cooling fan blades is greater than a number of the dust collection fan blades;

wherein the dust collection fan blades comprise at least one first counterweight fan blades that is partially thickened, the cooling fan blades comprise at least one second counterweight fan blades that is partially thickened, a thickness of the first counterweight fan blades is greater than that of the second counterweight fan blades.

18. The power tool of claim 17, wherein the first counterweight fan blades and the second counterweight fan blades are spaced apart on a radial periphery of the motor axis, and the second counterweight fan blades are provided above the first counterweight fan blades.

19. A power tool comprising:

a housing, a power assembly installed inside the housing, a fan assembly connected to the power assembly, and a bottom plate assembly driven by the power assembly, the power assembly comprising a motor axis, the fan assembly comprising a mounting plate connected to the power assembly, the mounting plate comprising a first surface and a second surface on opposite sides, the first surface defining a waist hole that extends through the mounting plate, and the fan assembly further comprising an eccentric element protruding from the second surface, the eccentric element comprising a first axis in a radial direction, and the mounting plate comprising a second counterweight block protruding from a periphery, an end surface of the waist hole facing the second counterweight block comprising a second axis;

wherein the first axis and the second axis form a phase angle, and an angle of the phase angle approaches zero.

20. The power tool of claim 19, wherein the first axis is parallel to or collinear with the second axis.

* * * * *